(12) United States Patent
Bevilacqua (10) Patent No.: US 10,005,515 B2
(45) Date of Patent: Jun. 26, 2018

(54) BICYCLE BOTTOM BRACKET

(71) Applicant: CAMPAGNOLO S.r.l., Vicenza (IT)

(72) Inventor: Sebastiano Bevilacqua, Martellago (IT)

(73) Assignee: Campagnolo S.r.l., Vicenza (IT)

( * ) Notice: Subject to any disclaimer, the term of this patent is extended or adjusted under 35 U.S.C. 154(b) by 0 days. days.

(21) Appl. No.: 15/587,654

(22) Filed: May 5, 2017

(65) Prior Publication Data

US 2017/0320537 A1    Nov. 9, 2017

(30) Foreign Application Priority Data

May 6, 2016   (IT) .............................. UA2016A3214

(51) Int. Cl.
  *B62M 3/00*      (2006.01)
  *B62K 19/34*    (2006.01)

(52) U.S. Cl.
  CPC ............. *B62M 3/003* (2013.01); *B62K 19/34* (2013.01)

(58) Field of Classification Search
  CPC ............................... B62M 3/003; B62K 19/04
  USPC ....................................................... 280/259
  See application file for complete search history.

(56) References Cited

U.S. PATENT DOCUMENTS

| | | | | |
|---|---|---|---|---|
| 6,003,889 | A * | 12/1999 | Shalom ................. | B60B 27/023 280/259 |
| 6,899,402 | B2 * | 5/2005 | Chiang .................... | B62M 3/00 280/259 |
| 7,650,817 | B2 * | 1/2010 | Shiraishi ................ | B62M 3/003 280/259 |
| 8,267,417 | B1 * | 9/2012 | Yamanaka ............. | B62M 3/003 280/259 |
| 8,393,794 | B1 * | 3/2013 | Shiraishi ................ | B62M 3/003 384/458 |
| 2002/0096015 | A1 | 7/2002 | Smith | |
| 2004/0140709 | A1 | 7/2004 | Kanehisa | |
| 2007/0241530 | A1 * | 10/2007 | Nonoshita ................ | B62M 3/00 280/259 |
| 2009/0261553 | A1 * | 10/2009 | Meggiolan ............. | B62M 3/003 280/259 |

(Continued)

FOREIGN PATENT DOCUMENTS

| | | |
|---|---|---|
| DE | 8110450 U1 | 10/1981 |
| FR | 2531506 A1 | 2/1984 |
| WO | 2008009301 A1 | 1/2008 |

OTHER PUBLICATIONS

Italian Search Report and Written Opinion in Italian Application No. UA2016A003214, dated Dec. 23, 2016, with English translation.

*Primary Examiner* — Tony H Winner
(74) *Attorney, Agent, or Firm* — Volpe & Koenig, P.C.

(57) ABSTRACT

A bottom bracket having a shaft having a longitudinal axis (X), first and second adapters radially outside of the shaft and associated with respective ends of a bottom bracket housing. Rolling bearings are radially interposed between the shaft and the first adapters with axial locking members axially outside the rolling bearings and in axial abutment on the first and second slewing bearings. A protective screen, positioned between a selected adapter and a radially outer surface of the associated axial locking members in the axial direction and at least partially outside of the first adapter, is fixedly connected to the selected adapter and comprising a sealing member arranged in sliding contact on the radially outer surface of the associated axial locking members.

15 Claims, 5 Drawing Sheets

(56) References Cited

U.S. PATENT DOCUMENTS

2013/0064488 A1   3/2013   Shiraishi

* cited by examiner

BICYCLE BOTTOM BRACKET

CROSS REFERENCE TO RELATED APPLICATION(S)

This application claims the benefit of Italian Application No. UA2016A003214, filed on May 6, 2016, which is incorporated herein by reference as if fully set forth.

FIELD OF INVENTION

The present invention relates to a bicycle bottom bracket.

BACKGROUND

As known, a bicycle bottom bracket comprises a shaft at the opposite ends of which a left pedal crank and a right pedal crank are respectively associable or associated. The bottom bracket is mounted on the bicycle housing the shaft in a housing box suitably provided in the bicycle frame. The rotation of the bottom bracket with respect to the housing box is obtained by inserting a pair of rolling bearings onto the shaft. The shaft is held in position in the housing box by caps that are screwed into the ends of the box or that are pressure-inserted into the ends of the box. In particular, in order to allow the shaft to rotate with respect to the box and to the caps, the rolling bearings are arranged between the caps and the shaft. Furthermore, in order to avoid movements of the shaft in a direction parallel to its rotation axis, each rolling bearing is held in position by shoulders provided, on the side facing towards the pedal cranks, on the shaft and, on the opposite side, by shoulders provided on the caps.

The rolling bearings therefore at least partially face the respective pedal cranks and are therefore partially exposed to external agents such as dust, water and mud that, during normal use of the bicycle, hit the area of the pedal cranks and of the housing box of the bottom bracket.

In order to avoid such external agents being able to reach the rolling bearings and compromise correct operation, solutions have been proposed wherein between each cap and the shaft there is a protective labyrinth of the rolling bearing. Such a labyrinth is made from rings fixedly connected to the shaft alternating with rings fixedly connected to the cap, so as to allow the rotation of the shaft with respect to the cap but avoid direct exposure of the rolling bearing to the external environment. Moreover, in order to protect the balls of the bearing from infiltration of water that passes through the aforementioned labyrinth, it has been proposed to insert an annular gasket fixedly connected to the slewing bearing of the bearing constrained to the cap and sliding on the slewing bearing constrained to the shaft.

The Applicant has noted that the provisions proposed are not a full solution, in other words they do not allow the rolling bearings to be effectively protected from external agents, in particular water.

The Applicant has indeed observed that, for example in the case of the bicycle being washed with pressurized water, the water easily passes through the aforementioned labyrinth and reaches the aforementioned annular gasket.

The Applicant has also noted that the water that reaches the gasket cannot pass back through the labyrinth in the opposite direction and tends to stay right in front of the bearing at the portion of gasket that slides on the slewing bearing constrained to the shaft, with inevitable leaking of water between gasket and slewing bearing.

The Applicant has also noted that the presence of clearance recovery systems of the bottom bracket, which usually are arranged between a rolling bearing and the respective pedal crank, creates substantial difficulties in making and applying the aforementioned labyrinth that is active precisely at the area in which the clearance recovery system is also present.

The Applicant has also noted that the mounting and maintenance of the protection system of the rolling bearing summarily described above are very complicated also due to the presence of a large number of components to be installed in the correct position.

SUMMARY

The present invention relates to a bottom bracket for bicycles comprising:

a shaft having a longitudinal axis extending along a predetermined direction and comprising a first axial end portion and a second axial end portion;

a first adapter radially outside of, and crossed by, said shaft and intended to be associated with a first end of a housing box of the bottom bracket in a bicycle frame;

a second adapter radially outside of, and crossed by, said shaft and designed to be associated with a second end of a housing box of the bottom bracket in a bicycle frame;

a first rolling bearing radially interposed between said shaft and said first adapter and a second rolling bearing radially interposed between said shaft and said second adapter;

first axial locking members, arranged in an axially outer position with respect to said first and second rolling bearing, respectively, and in axial abutment on a first slewing bearing of the first rolling bearing and on a first slewing bearing of the second rolling bearing;

a first protective screen that extends, in a radial direction, between a radially outer surface of the first adapter and a radially outer surface of said first axial locking members and that extends, in the axial direction, at least partially outside of the first adapter, said first protective screen being fixedly connected to said first adapter and comprising a sealing member arranged in sliding contact on said radially outer surface of said first axial locking members.

In accordance with the present invention, the first protective screen prevents dust, water or mud from being able to reach the rolling bearing compromising the functionality thereof. In particular, the sliding contact between the sealing member and the radially outer surface of the first axial locking members prevents the entry of water, dust or mud in the region immediately in front of the rolling bearing. Furthermore, the first protective screen, which extends between a radially outer surface of the first adapter and the radially outer surface of said first axial locking members, prevents direct exposure of the first bearing to external agents. The axial development of the first protective screen at least partially outside of the first adapter further allows it to be easily reached during installation and maintenance operations.

Preferably, the sealing member is further active on an outer surface of the first adapter.

In this way, dust, water or mud is prevented from infiltrating between the first protective screen and the first adapter, fixedly connected and constrained to one another, and reaching the rolling bearing.

Preferably, the first protective screen comprises an annular support body to which said sealing member is constrained; said sealing member being made of a more yielding material with respect to said annular support body.

These features allow the first adapter to be stably constrained with the protective screen preventing it from deforming when subjected to external forces, for example while the bicycle is being washed with pressurized water, in any case ensuring elastic deformability of the sealing member that allows it to slide on the outer surface of the first locking members making a fluid-tight seal with them.

In the preferred embodiment, the annular support body is made of metallic material, for example aluminum, whereas the sealing member is an elastomer.

Preferably, the annular support body is constrained to said radially outer surface, said radially outer surface being arranged at a portion, outside of the housing box, of the first adapter.

Preferably, the annular support body comprises a substantially cylindrical radial portion to which a substantially annular axial portion is joined.

In the preferred embodiment, the radial portion of the annular support body passes over said radially outer surface of the first adapter so that the axial portion of the annular support body is positioned axially outside of the first adapter.

Preferably, the sealing member is arranged on the annular support body on a surface thereof facing the opposite way with respect to the first rolling bearing.

In an alternative embodiment, the sealing member is arranged on the surface of the annular support body facing towards the first adapter.

Preferably, the first rolling bearing comprises said first slewing bearing inserted onto said shaft and a second slewing bearing coupled with a radially inner surface of the first adapter; said second rolling bearing comprising a first slewing bearing inserted onto said shaft and a second slewing bearing coupled with a radially inner surface of the second adapter.

In the preferred embodiment of the invention, the first axial locking members comprise, at the first rolling bearing, a spacer provided with said radially outer surface on which said sealing member slides; said spacer being in axial abutment against the first slewing bearing of the first rolling bearing and having an annular gasket radially active between said radially outer surface and said shaft.

In this way, it is possible to prevent any possible water, dust or mud that reaches the spacer from being able to infiltrate between the spacer itself and the shaft and reach the first rolling bearing by getting past the seal made by the sealing member on the radially outer surface of the spacer.

Preferably, the bottom bracket comprises, at said first rolling bearing, an adjustment ring nut axially outside of said spacer and in axial abutment against it; said sealing member being in sliding contact with said adjustment ring nut.

The adjustment ring nut allows small axial clearances to be recovered during installation of the bottom bracket. The sliding contact of the sealing member on the adjustment ring nut prevents possible dust, water or mud from being able to infiltrate between the adjustment ring nut and the spacer, staying in an area close to the rolling bearing.

Preferably, the adjustment ring nut is inserted onto the shaft and has an extension in the radial direction that is greater than the extension in the radial direction of the spacer.

Preferably, said sealing member comprises a radially inner end shaped like a frustum of cone; said radially inner end shaped like a frustum of cone being in sliding contact both with said spacer and with said adjustment ring nut.

Preferably, the larger base and the smaller base of the frustum of cone that defines then radially inner end of the sealing member are substantially perpendicular to the rotation axis of the shaft.

Preferably, the larger base of the frustum of cone that defines the first radially inner end of the sealing member is in sliding contact against an axially inner wall of the adjustment ring nut.

Preferably, the smaller base of the frustum of cone that defines the first radially inner end of the sealing member is in sliding contact against the radially outer wall of the spacer.

Such a shape of the sealing member maximizes the sealing effect preventing any leaking of water, dust or mud through the sliding contact made by the sealing member.

Preferably, the bicycle bottom bracket in accordance with the present invention comprises a second protective screen that extends, in the radial direction, between a radially outer surface of the second adapter and a radially outer surface of said first axial locking members and that extends, in the axial direction, at least partially outside of the second adapter, said second protective screen being fixedly connected to said second adapter and comprising a sealing member arranged in sliding contact on said radially outer surface of said first axial locking members.

In this way, the second rolling bearing is also protected from water, mud and dust.

Preferably, the first axial locking members comprise, at said second rolling bearing, a first annular shoulder of said shaft in axial abutment against the first slewing bearing of the second rolling bearing and provided with said radially outer surface on which said sealing member slides.

Preferably, at the second rolling bearing the aforementioned spacer and the aforementioned adjustment ring nut are not therefore provided. In other words, the position of the second rolling bearing with respect to the shaft is predetermined and cannot be changed.

For this purpose, preferably the bottom bracket comprises, at said second rolling bearing, a second annular shoulder axially following the first annular shoulder and radially more outer with respect to the first annular shoulder; said sealing member being in sliding contact with said sealing member of the second protective screen.

Preferably, the axial and radial extension of said spacer is equal to the radial and axial extension of said first shoulder and the radial extension of the adjustment ring nut is equal to the radial extension of said second shoulder.

In this way, the first locking members at the second rolling bearing have a shape and axial and radial bulks substantially identical to the first locking members at the first rolling bearing. This makes it possible to provide at least the sealing member of the second protective screen identical, in shape and size, to the sealing member of the first protective screen.

In some embodiments, the entire second protective screen is identical in shape and size to the first protective screen.

Preferably, the bottom bracket in accordance with the present invention comprises a tubular connection element, axially arranged between the first and the second adapter and radially outside of said shaft.

This allows the shaft to be contained inside the tubular element and the first and second adapter when the bottom bracket is inserted inside the housing box, preventing possible dirt, water or mud coming from the tube of the bicycle frame to which the housing box is constrained from being able to directly hit the shaft.

In an embodiment of the invention, said tubular element is provided, at opposite axial ends, with fluid-tight coupling elements with portions of the first and second adapter, respectively.

In this embodiment, each fluid-tight coupling element comprises a radially outer annular throat in which an annular gasket is inserted.

In another embodiment, said tubular element comprises a first half-part in one piece with the first adapter and a second half-part in one piece with the second adapter; said first half-part axially passing over at least part of the second half-part; fluid-tight coupling elements being active between the first and the second half-part of the tubular element.

In this embodiment, the fluid-tight coupling elements comprise a radially outer annular throat arranged at an axial end of the second half-part of the tubular element in which an annular gasket is inserted.

BRIEF DESCRIPTION OF THE DRAWINGS

Further features and advantages of the present invention will become clearer from the following detailed description of some preferred embodiments thereof, made with reference to the attached drawings, given for indicating and not limiting purposes. In such drawings.

DETAILED DESCRIPTION OF THE PREFERRED EMBODIMENTS

Apart from where expressly indicated otherwise, the features of the bottom brackets according to the various embodiments of the attached figures should be considered to be common to all of the bottom brackets.

In the description and in the subsequent claims, the terms "radial" and "axial" are used with reference to directions respectively perpendicular and parallel (or coinciding) with a rotation axis of the shaft of the bottom bracket.

The expressions "radially inner" and "radially outer" respectively indicate a positioning closer to and further from the aforementioned rotation axis.

The expressions "axially inner" and "axially outer" respectively indicate a positioning closer to and further from a reference plane perpendicular to the rotation axis of the shaft of the bottom bracket, passing through a middle section of the bottom bracket.

The term "sealing member" or "sealing element" indicates a component capable of preventing the passage of a fluid between two areas divided by the component itself.

In the attached figures, reference numeral 1 indicates a bottom bracket for a bicycle in accordance with the present invention. The bottom bracket 1 comprises a shaft 2 having a longitudinal axis X extending along a predetermined direction. The longitudinal axis X coincides with a rotation axis of the shaft 2. The shaft 2 comprises opposite axial end portions 3 and 4, left and right respectively, with which a right pedal crank 20 and a left pedal crank 21 are respectively associable or preferably associated (only partially illustrated in FIGS. 4, 6 and 7). In the embodiments illustrated in the attached figures, the shaft 2 is made up of a first half-part 2a and a second half-part 2b joined together, at a middle plane M of the bottom bracket 1, by a suitable bolt. In these embodiments, the shaft 2 is substantially cylindrical and internally hollow.

The shaft 2 is supported in rotation in a housing box 10 suitably provided in the bicycle frame through the interposition of a first rolling bearing 30 and a second rolling bearing 40 suitably inserted in radially outer position on the shaft 2. The housing box 10 is substantially cylinder-shaped and extends along a longitudinal axis intended to coincide with the axis X of the shaft 2 when such a shaft is housed inside the housing box 10.

In the specific embodiment illustrated in the attached figures, the first 30 and the second rolling bearing 40 are ball bearings, but it is possible to use other types of bearings adapted for ensuring relative rotary motion between shaft 2 and housing box 10, like for example roller bearings.

The first 30 and the second bearing 40 are respectively inserted in a first adapter 50 and in a second adapter 60. The first 50 and the second adapter 60 are constrained inside the housing box 10 at the opposite free end portions 11 and 12 of such a housing box 10.

The mechanical constraint between the first 50 and the second adapter 60 and the housing box 10 can be obtained by providing the first 50 and the second adapter 60 with a threaded outer surface and, at the same time, threading the inner surface of the housing box 10 at the free ends 11, 12.

Alternatively, the first 50 and the second adapter 60 can be pressure-inserted into the free ends 11, 12 of the housing box 10 so as to make a "press fit" coupling. In this case, such a coupling can be further reinforced by glues inserted between the first 50 and the second adapter 60 and the housing box 10.

In any case, the first 50 and the second adapter 60 comprise a respective portion 52, 62 inserted inside the housing box 10 and a respective portion 53, 63 outside of the housing box 10.

In its assembled configuration, the first bearing 30 has a first slewing bearing 31 coupled with the shaft 2 in a position radially outside of it and axially adjacent to the end portion 3 and a second slewing bearing 32 coupled with a radially inner annular surface 51 of the first adapter 50. Similarly, the second bearing 40 has a first slewing bearing 41 coupled with the shaft 2 in a position radially outside of it and axially adjacent to the end portion 4 and a second slewing bearing 42 coupled with a radially inner annular surface 61 of the second adapter 60.

Figure 1:
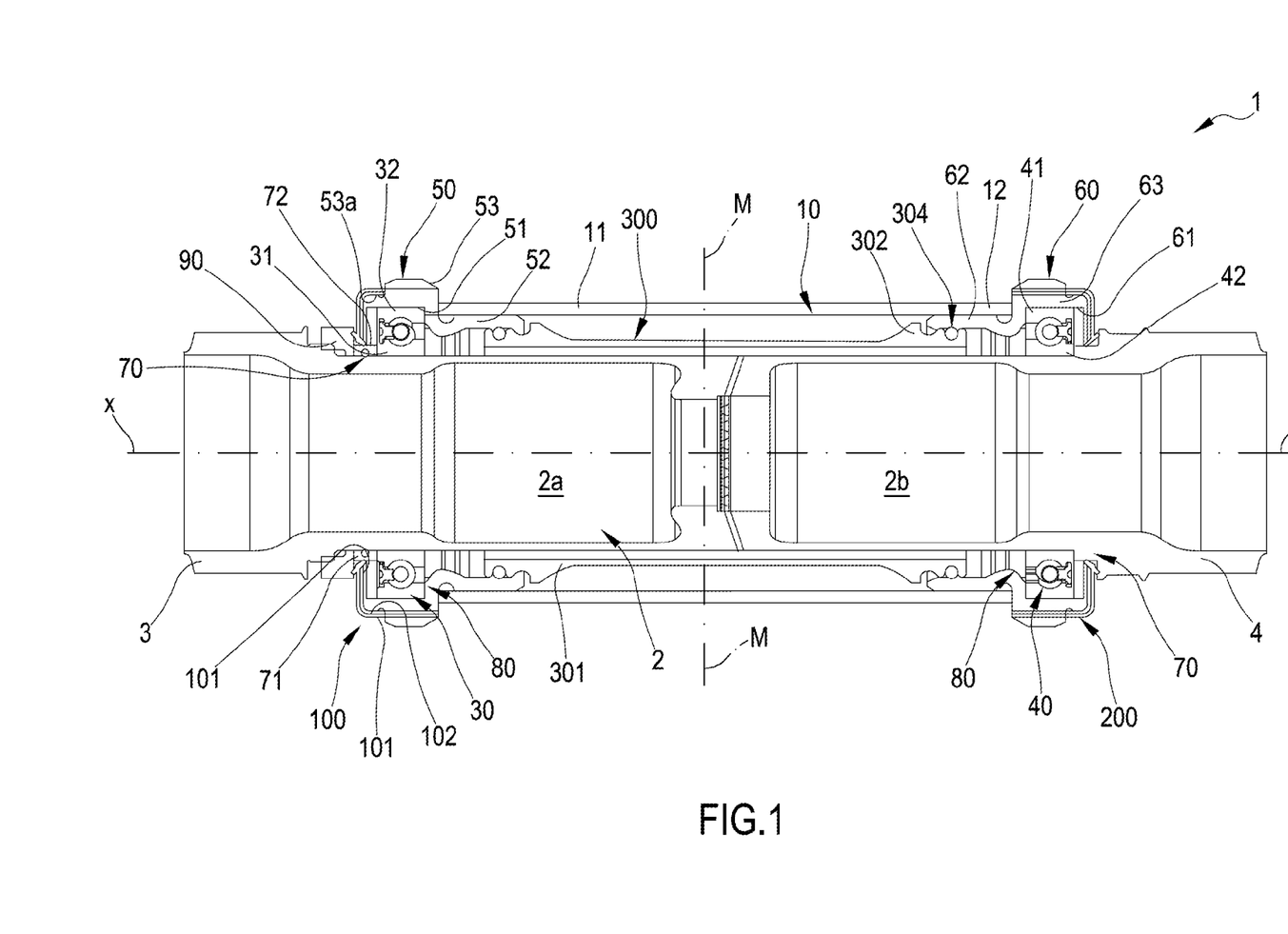
FIG. 1 is a longitudinal section view of a bicycle bottom bracket in accordance with a first embodiment of the present invention.
Figure 2:
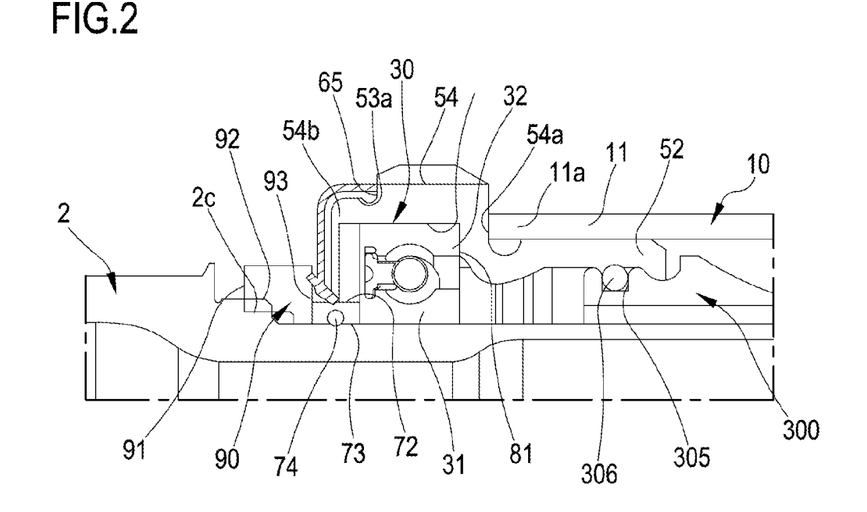
FIG. 2 shows some details of the bottom bracket of FIG. 1 in a longitudinal section view.
Figure 3:
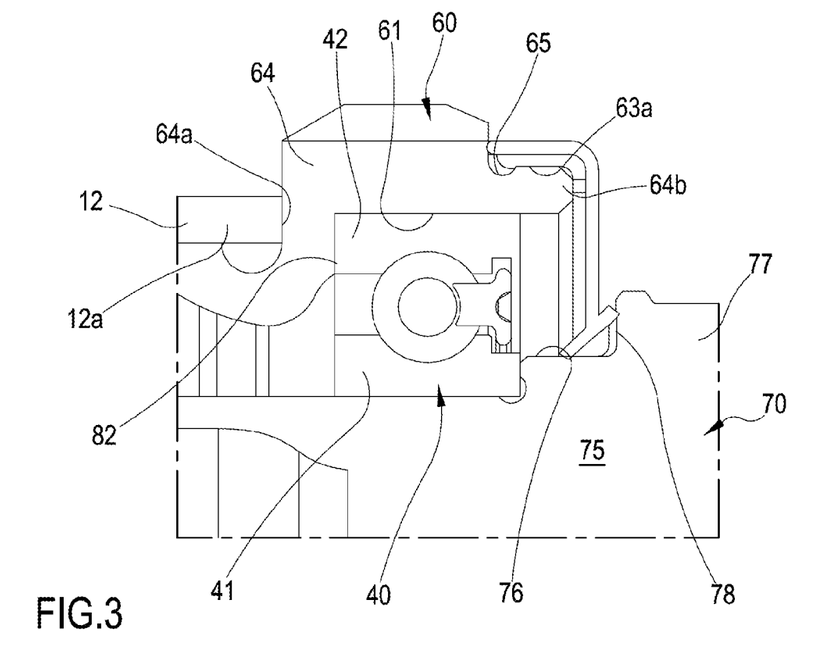
FIG. 3 shows further details of the bottom bracket of FIG. 1 in a longitudinal section view.

In the embodiment illustrated in FIGS. 1, 2 and 3, the second slewing bearing 32 of the first rolling bearing 30 is arranged in the portion 53 of the first adapter 50 outside of the housing box 10. In this embodiment, the second slewing bearing 42 of the second rolling bearing 40 is arranged in the portion 63 of the second adapter 60 outside of the housing box 10.

In the embodiments of FIGS. 4, 5, 6 and 7, the second slewing bearing 32 of the first rolling bearing 30 is arranged in the portion 52 of the first adapter 50 inside the housing box 10. In these embodiments, the second slewing bearing 42 of the second rolling bearing 40 is arranged in the portion 62 of the second adapter 60 inside the housing box 10.

In all of the embodiments, the first 50 and the second adapter 60 comprise a respective flange 54, 64 arranged in the portion 53, 63 outside of the housing box 10.

Each flange 54, 64 comprises an axially inner abutment surface 54a, 64a intended to abut against the axial end edge 11a, 12a of the respective end portion 11, 12 of the housing box 10.

The bottom bracket 1 comprises first axial locking members 70 the function of which is to prevent, in combination with second axial locking members 80, axial movements of the shaft 2 once installed.

The first axial locking members 70 comprise, at the first rolling bearing 30, a spacer 71 inserted radially outside of the shaft 2. The spacer 71 is arranged axially outside of the first rolling bearing 30 and is in axial abutment against the first slewing bearing 31 thereof.

The spacer 71 is provided with a radially outer surface 72 and with a radially inner surface 73, the latter in direct contact with the shaft 2. The spacer 71 is provided with an annular groove in which an annular gasket 74 is housed, as schematically represented in FIG. 2. The annular gasket 74 prevents any leaking of fluid between the radially inner surface 73 of the spacer 71 and the shaft 2.

The bottom bracket 1 further comprises, at the first rolling bearing 30, an adjustment ring nut 90 arranged axially outside of the spacer 71 and in axial abutment against it. The adjustment ring nut 90 is inserted onto the shaft 2 and is axially mobile with respect to it.

Figure 5:
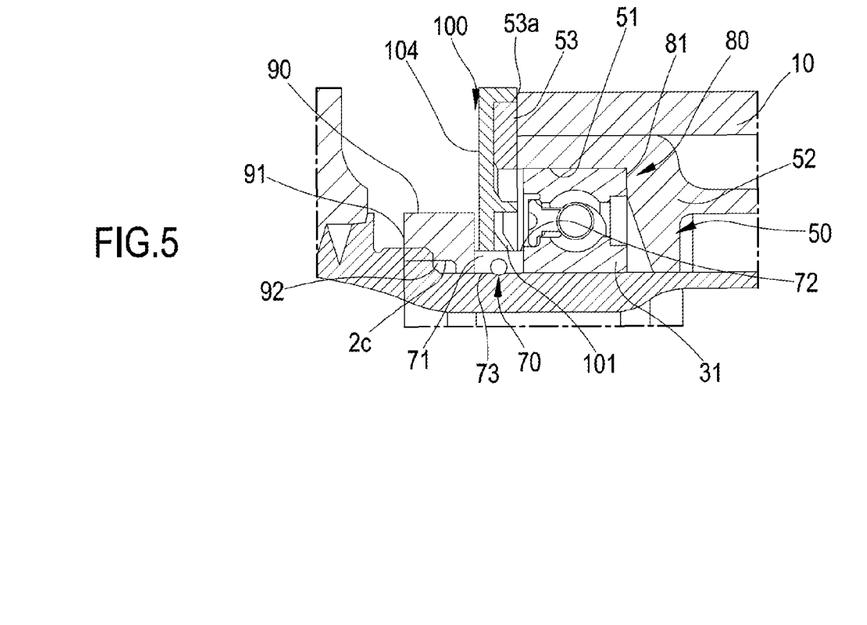
FIG. 5 shows a detail of the bottom bracket of FIG. 4.

For this purpose, the adjustment ring nut 90 comprises, at an outer axial portion 91, a threaded radially inner surface 92 engaged on a threaded annular portion 2c of the shaft 2 (FIGS. 2 and 5). By rotating the adjustment ring nut 90 with respect to the shaft 2 in the clockwise and counter-clockwise direction, the adjustment ring nut 90 translates axially in two opposite directions along the shaft 2. When the adjustment ring nut 90 is not set in rotation with respect to the shaft 2, it is axially fixedly connected to the shaft 2. The translation of the adjustment ring nut 90 has the purpose of ensuring that the adjustment ring nut 90 is in axial abutment against the spacer 71 blocking possible axial translations of the first slewing bearing 31. The adjustment ring nut 90 is used, in other words, to recover possible axial clearances between shaft 2 and housing box 10.

The adjustment ring nut 90 has a radial extension of the axially inner wall 93 that contacts the spacer 71 that is greater than the radial extension of an axially inner portion of the spacer 71.

Figure 4:
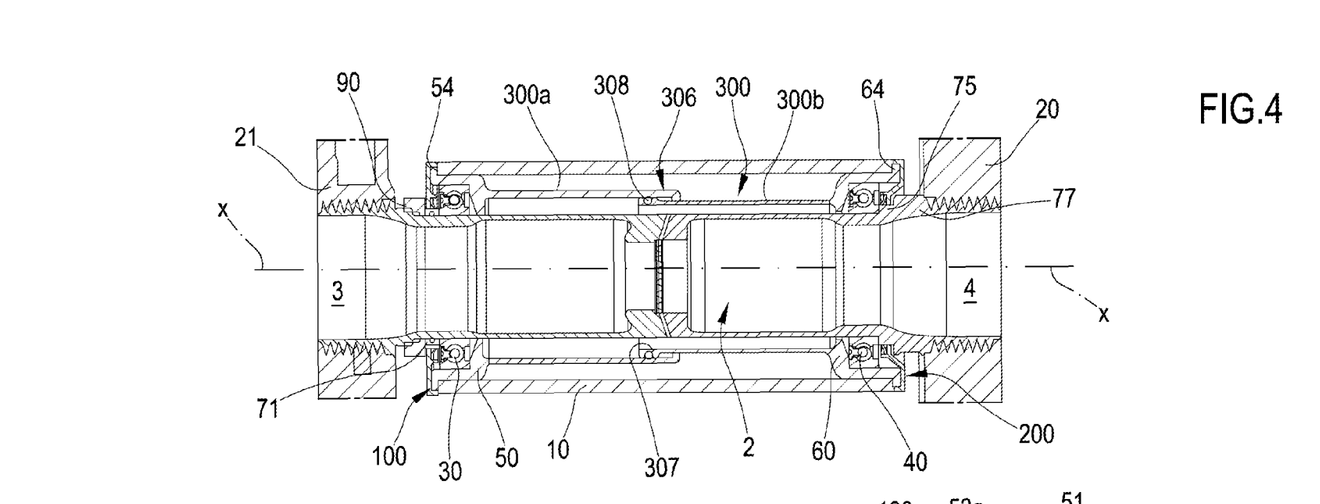
FIG. 4 is a longitudinal section of a second embodiment of the bottom bracket of FIG. 1.
Figure 7:
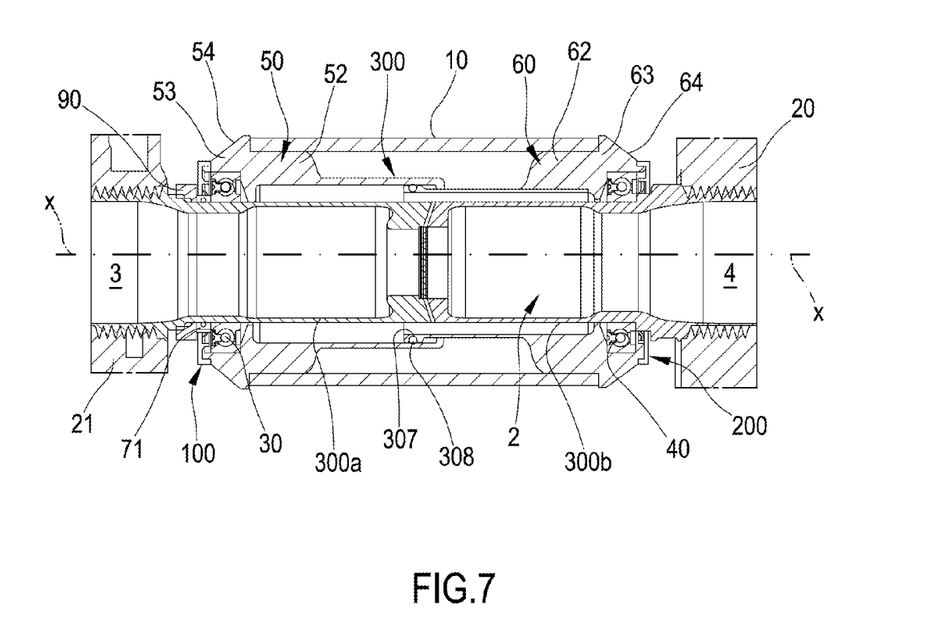
FIG. 7 is a longitudinal section of a fourth embodiment of the bottom bracket of FIG. 1.

In the embodiments of FIGS. 1, 4 and 7, the adjustment ring nut 90 has a greater radial extension of the axially inner wall 93 that contacts the spacer 71 than the radial extension of the entire spacer 71.

The first axial locking members 70 comprise, at the second rolling bearing 40, a first annular shoulder 75, axially outside of the second bearing 40. The first annular shoulder 75 is in one piece with the shaft 2 and is in axial abutment against the first slewing bearing 41 of the second rolling bearing 40. The first annular shoulder 75 comprises a radially outer surface 76 facing towards the second adapter 60.

A second annular shoulder 77 is foreseen axially outside of the first annular shoulder 75. The second annular shoulder 77 is in one piece with the shaft 2 and is consecutive to the first annular shoulder 75, in one piece with it. The second annular shoulder 77 has an axially inner wall 78 that emerges radially away from the radially outer surface 76 of the first annular shoulder 75 (FIG. 3).

The radial extension of the second annular shoulder 77 is greater than the radial extension of the first annular shoulder 75.

Figure 6:
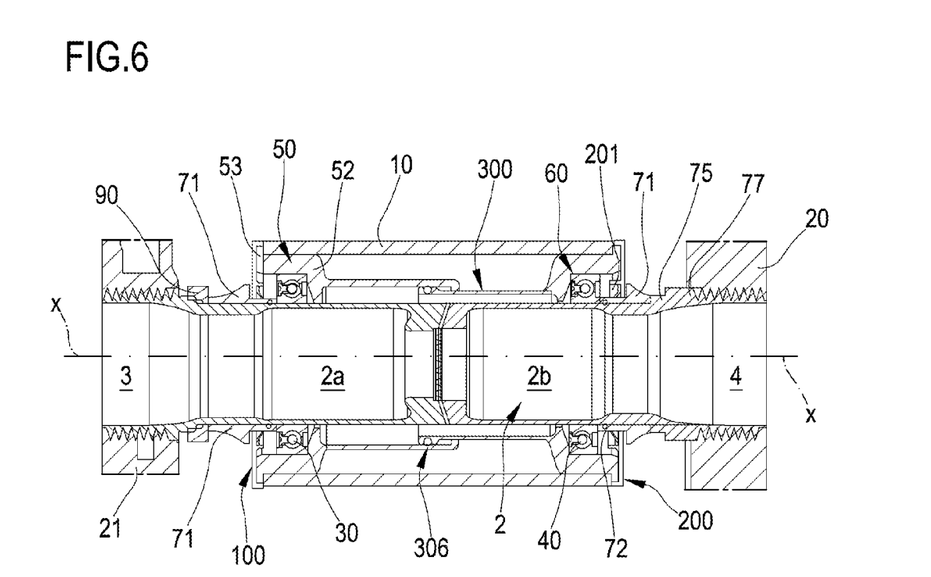
FIG. 6 is a longitudinal section of a third embodiment of the bottom bracket of FIG. 1.

The embodiment illustrated in FIG. 6 differs from what has been described above in relation to the first 75 and to the second annular shoulder 77 in that the first annular shoulder 75 is not in axial abutment against the first slewing bearing 41 of the second rolling bearing 40.

In this embodiment, the first slewing bearing 41 of the second rolling bearing 40 is in axial abutment against a spacer 71 identical to the spacer 71 in axial abutment against the first slewing bearing 31 of the first rolling bearing 30. The spacer 71 in axial abutment against the first slewing bearing 41 of the second rolling bearing 40 is further in axial abutment, on the opposite side with respect to the second rolling bearing 40, against the first annular shoulder 75.

The second axial locking members 80 comprise an abutment shoulder 81 for the second slewing bearing 32 of the first rolling bearing 30 and an abutment shoulder 82 for the second slewing bearing 42 of the second rolling bearing 40.

The abutment shoulder 81 for the second slewing bearing 32 of the first rolling bearing 30 is formed in the first adapter 50 at the aforementioned radially inner annular surface 51 that receives the second slewing bearing 32, in particular at an axially inner end of the radially inner annular surface 51.

The abutment shoulder 82 for the second slewing bearing 42 of the second rolling bearing 40 is formed in the second adapter 60 at the aforementioned radially inner annular surface 61 that receives the second slewing bearing 42, in particular at an axially inner end of the radially inner annular surface 61.

The bottom bracket 1 further comprises a first protective screen 100 arranged to protect the first rolling bearing 30.

The first protective screen 100 is arranged axially outside of the first adapter 50 and is constrained and fixedly connected to it.

The first protective screen 100 is constrained and fixedly connected to a radially outer surface 53a of the portion 53 outside of the housing box 10 of the first adapter 50 and extends until it reaches the radially outer surface 72 of the spacer 71. The aforementioned radially outer surface 53a is arranged on the flange 54 at an outer axial end 54b of the first adapter 50 opposite the axially inner abutment surface 54a of the flange 54.

The first protective screen 100 comprises a sealing member 101 in sliding contact with the radially outer surface 72 of the spacer 71.

The first protective screen 100 further comprises an annular support body 102 to which the sealing member 101 is constrained. The latter is made of elastomer, whereas the annular sealing body is preferably made of metallic material, like for example aluminum.

The annular support body 102 has a radial portion 103 and an axial portion 104 that is joined to the radial portion 103. The radial portion 103 is substantially cylinder-shaped and has an annular tooth 103a arranged at its free axial end and projecting radially internally.

Such an annular tooth 103a is intended to engage an annular groove 55 formed on the radially outer surface 53a of the portion 53 outside of the housing box 10 of the first adapter 50. The engagement of the annular tooth 103a in the groove 55 takes place by elastic deformation of the radial portion 103 of the annular support body 102.

From the above it is clear that the radial portion 103 of the annular support body passes over and wraps around the radially outer surface 53a of the portion 53 outside of the housing box 10 of the first adapter 50.

Figure 8:
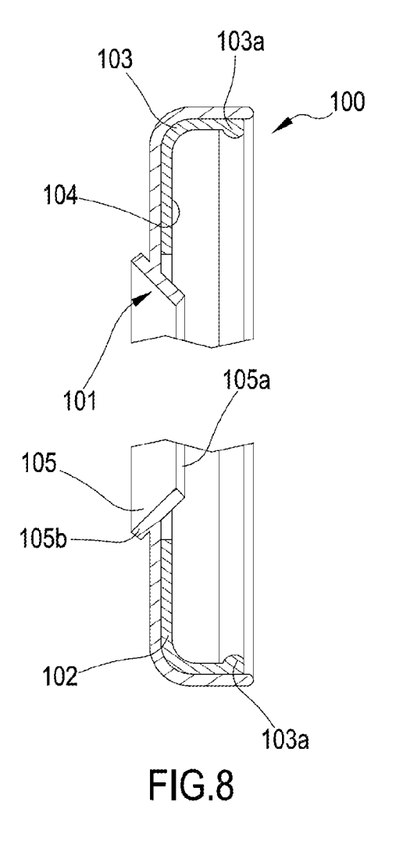
FIGS. 8 and 9 are longitudinal sections of two details of the bottom bracket of FIG. 1.

In the embodiment of the first protective screen 100 illustrated in FIG. 8, the sealing member 101 is arranged on the annular support body 102 on the opposite side with respect to the first rolling bearing 30, in other words axially outside of the annular support body 102.

In a different embodiment of the first protective screen 100, such as that of the first protective screen 100 illustrated in FIGS. 4, 6 and 7, the sealing member 101 is arranged on the annular support body 102 on the side facing towards the first rolling bearing 30, in other words axially inside the annular support body 102.

In this embodiment of the first protective screen 100, the sealing member 101 is a lip packing seal applied only in the radially inner portion of the annular support body 102 and sliding on the radially outer surface 72 of the spacer 71.

In the embodiment illustrated in FIG. 8, the sealing member 101 extends for the entire extension of the annular support body 102 and is in contact with the first adapter 50 on the opposite side with respect to the sliding contact with the radially outer surface 72 of the spacer 71.

In this embodiment the sealing member 101 is in contact against the first adapter 50 at the end of the annular support body 102 that carries the annular tooth 103a. Such contact is made on a wall of the flange 50 immediately adjacent to the radially outer surface 53a.

In the embodiment of FIG. 8, the sealing member 101 comprises a radially inner end 105 shaped like a frustum of cone with a smaller base 105a substantially perpendicular to the rotation axis of the shaft 2 and a larger base 105b parallel to the smaller base 105a.

The smaller base 105a of the radially inner end 105 shaped like a frustum of cone of the sealing member 101 is in sliding contact against the radially outer surface 72 of the spacer 71.

The sealing member 101 according to the embodiment of FIG. 8 is further in sliding contact against the adjustment ring nut 90. In particular, the larger base 105b of the radially inner end 105 shaped like a frustum of cone of the sealing member 101 is in sliding contact against the axially inner wall 93 of the adjustment ring nut 90.

The bottom bracket 1 further comprises a second protective screen 200 arranged to protect the second rolling bearing 40.

The second protective screen 200 is arranged axially outside of the second adapter 60 and is constrained and fixedly connected to it.

The second protective screen 200 is constrained and fixedly connected to a radially outer surface 63a of the portion 63 outside of the housing box 10 of the second adapter 60 and extends until it reaches the radially outer surface 76 of the first annular shoulder 75. The aforementioned radially outer surface 63a is arranged on the flange 64 at an outer axial end 64b of the second adapter 60 opposite the axially inner abutment surface 64a of the flange 64.

The second protective screen 200 comprises a sealing member 201 in sliding contact with the radially outer surface 76 of the first annular shoulder 75.

In the embodiment of FIG. 6, the sealing member 201 of the second protective screen 200 is in sliding contact against the radially outer surface 72 of the spacer 71 (which, as described above, in this embodiment is also present at the second rolling bearing 40).

The second protective screen 200 further comprises an annular support body 202 to which the sealing member 201 is constrained. The latter is made of elastomer, whereas the annular sealing body is preferably made of metallic material, like for example aluminum.

The annular support body 202 has a radial portion 203 and an axial portion 204 that is joined to the radial portion 203. The radial portion 203 is substantially cylinder-shaped and has an annular tooth 203a arranged at its free axial end and projecting radially internally.

Such an annular tooth 203a is designed to engage an annular groove 65 formed on the radially outer surface 63a of the portion 63 outside of the housing box 10 of the second adapter 60. The engagement of the annular tooth 203a in the groove 65 takes place by elastic deformation of the radial portion 203 of the annular support body 202.

From the above it is clear that the radial portion 203 of the annular support body 202 passes over and wraps around the radially outer surface 63a of the portion 63 outside of the housing box 10 of the second adapter 60.

Figure 9:
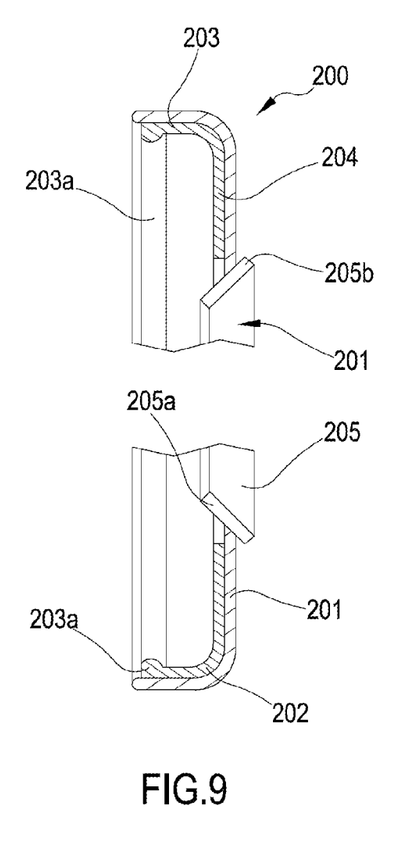

In the embodiment of the second protective screen 200 illustrated in FIG. 9, the sealing member 201 is arranged on the annular support body 202 on the opposite side with respect to the second rolling bearing 40, in other words axially outside of the annular support body 202.

In a different embodiment of the second protective screen 200, such as that of the first protective screen 200 illustrated in FIGS. 4, 6 and 7, the sealing member 201 is arranged on the annular support body 202 on the side facing towards the second rolling bearing 40, in other words axially inside the annular support body 202.

In this embodiment of the second protective screen 200, the sealing member 201 is a lip packing seal applied only in the radially inner portion of the annular support body 202 and sliding on the radially outer surface 76 of the first annular shoulder 75.

In the embodiment illustrated in FIG. 9, the sealing member 201 extends for the entire extension of the annular support body 202 and is in contact with the second adapter 60 on the opposite side with respect to the sliding contact with the radially outer surface 76 of the first annular shoulder 75.

In this embodiment the sealing member 201 is in contact against the second adapter 60 at the end of the annular support body 202 that carries the annular tooth 203a. Such contact is made on a wall of the flange 60 immediately adjacent to the radially outer surface 63a.

In the embodiment of FIG. 9, the sealing member 201 comprises a radially inner end 205 shaped like a frustum of cone with a smaller base 205a substantially perpendicular to the rotation axis of the shaft 2 and a larger base 205b parallel to the smaller base 205a.

The smaller base 205a of the radially inner end 205 shaped like a frustum of cone of the sealing member 201 is in sliding contact against the radially outer surface 76 of the first annular shoulder 75.

The sealing member 201 according to the embodiment of FIG. 9 is further in sliding contact against the second annular shoulder 77. In particular, the larger base 205b of the radially inner end 205 shaped like a frustum of cone of the sealing member 201 is in sliding contact against the axially inner wall 78 of the second annular shoulder 77.

The first 100 and the second protective screen 200 are, in the embodiment of FIGS. 8 and 9 identical to one another, as are the first 100 and the second protective screen 200 according to FIGS. 6 and 7.

Furthermore, the first 100 and the second screen 200 according to the embodiment of FIGS. 8 and 9, can be used in combination both with first 50 and second adapters 60 of the type screwed to the end of the housing box 10 (described above) and in combination with first 50 and second adapters 60 of the "press fit" type (described above).

The bottom bracket 1 further comprises a tubular connection element 300 arranged axially between the first 50 and the second adapter 60 and radially contained inside the housing box 10.

In the embodiment of FIG. 1, the tubular element 300 comprises, at opposite axial ends 301, 302, fluid-tight coupling elements 304 to couple fluid-tight with the first 50 and the second adapter 60.

In this embodiment, the axial ends 301, 302 of the tubular element 300 are coupled fluid-tight with the portions 52, 62 inserted inside the housing box 10 of the first 50 and of the second adapter 60.

In particular, each fluid-tight coupling element 304 comprises a respective radially outer annular throat 305 in which an annular gasket 306 is inserted. Each annular gasket 306 is in abutment, when the bottom bracket is assembled, against a radially inner wall of the respective portion 52, 62 inserted inside the housing box 10 of the first 50 and of the second adapter 60.

In the embodiment illustrated in FIGS. 4, 6 and 7, the tubular element 300 comprises a first half-part 300*a* in one piece with the first adapter 50 and a second half-part 300*b* in one piece with the second adapter 60. The first half-part 300*a* extends from the axially inner end of the portion 52 inserted inside the housing box 10 of the first adapter 50. The second half-part 300*b* extends from the axially inner end of the portion 62 inserted inside the housing box 10 of the second adapter 50.

In this embodiment, the tubular element 300 comprises fluid-tight coupling elements 306 active between the first 300*a* and the second half-part 300*b* that, in a middle region of the bottom bracket, are juxtaposed. In particular, the second half-part 300*b* is partially inserted inside the first half-part 300*a*.

In this embodiment the fluid-tight coupling elements 306 comprise a radially outer annular throat 307 arranged at the free axial end of the second half-part 300*b* in which an annular gasket 308 is inserted. The annular gasket 308 is further in abutment against a radially inner surface of the first half-part 300*a*.

Of course, those skilled in the art can bring numerous modifications and variants to the invention described above, in order to satisfy specific and contingent requirements, all of which are in any case encompassed by the scope of protection of the present invention as defined by the following claims.

What is claimed is:

1. A bottom bracket for bicycles comprising:
   a shaft having a longitudinal axis extending along a predetermined direction and comprising a first axial end portion and a second axial end portion;
   a first adapter radially outside of, and crossed by, said shaft and designed to be associated with a first end of a box for housing the bottom bracket in a bicycle frame;
   a second adapter radially outside of, and crossed by, said shaft and designed to be associated with a second end of a box for housing the bottom bracket in a bicycle frame;
   a first rolling bearing radially interposed between said shaft and said first adapter and a second rolling bearing radially interposed between said shaft and said second adapter;
   first axial locking members, arranged in axially outer position, respectively, with respect to said first and second rolling bearings and in axial abutment on a first slewing bearing of the first rolling bearing and on a first slewing bearing of the second rolling bearing; and
   a first protective screen extends in a radial direction between a radially outer surface of the first adapter and a radially outer surface of said first axial locking members, said first protective screen extends in an axial direction at least partially outside of the first adapter, and said first protective screen being fixedly connected to said first adapter and comprising a sealing member arranged in sliding contact on said radially outer surface of said first axial locking members.

2. The bottom bracket according to claim 1, wherein said sealing member is also active on an outer surface of the first adapter.

3. The bottom bracket according to claim 1, wherein said first protective screen comprises an annular support body to which said sealing member is constrained; said sealing member being made of a more yielding material with respect to said annular support body.

4. The bottom bracket according to claim 3, wherein said annular support body is constrained to said radially outer surface, said radially outer surface being arranged at a portion, outside of the housing box, of the first adapter.

5. The bottom bracket according to claim 1, wherein said first rolling bearing comprises said first slewing bearing inserted onto said shaft and a second slewing bearing coupled with a radially inner surface of the first adapter; said second rolling bearing comprising a first slewing bearing inserted onto said shaft and a second slewing bearing coupled with a radially inner surface of the second adapter.

6. The bottom bracket according to claim 1, wherein said first axial locking members comprise, at the first rolling bearing, a spacer having said radially outer surface on which said sealing member slides; said spacer being in axial abutment against the first slewing bearing of the first rolling bearing and having an annular gasket radially operatively active between said radially outer surface and said shaft.

7. The bottom bracket according to claim 6, further comprising, at said first rolling bearing, an adjustment ring nut axially outside of said spacer and in axial abutment against it; said sealing member further being in sliding contact with said adjustment ring nut.

8. The bottom bracket according to claim 7, wherein said sealing member comprises a radially inner end shaped like a frustum of cone; said radially inner end shaped like a frustum of cone being in sliding contact with said spacer and with said adjustment ring nut.

9. The bottom bracket according to claim 1, further comprising, a second protective screen that extends, in the radial direction, between a radially outer surface of the second adapter and a radially outer surface of said first axial locking members and that extends, in the axial direction, at least partially outside of the second adapter, said second protective screen being fixedly connected to said second adapter and comprising a sealing member arranged in sliding contact on said radially outer surface of said first axial locking members.

10. The bottom bracket according to claim 9, wherein said first axial locking members comprise, at said second rolling bearing, a first annular shoulder of said shaft in axial abutment against the first slewing bearing of the second rolling bearing and provided with said radially outer surface on which said sealing member slides.

11. The bottom bracket according to claim 10, further comprising, at said second rolling bearing, a second annular shoulder axially following the first annular shoulder and radially more outer with respect to the first annular shoulder; said sealing member further being in sliding contact with said second annular shoulder.

12. The bottom bracket according to claim 11, wherein axial and radial extensions of said spacer are equal to respective radial and axial extensions of said first annular shoulder, and a radial extension of the adjustment ring nut is equal to a radial extension of said second annular shoulder.

13. The bottom bracket according to claim 1, further comprising, a tubular connection element axially arranged between the first adapter and the second adapter, and radially arranged outside of said shaft.

14. The bottom bracket according to claim 13, wherein said tubular element is provided, at opposite axial ends, with fluid-tight coupling elements with portions of the first adapter and the second adapter, respectively.

15. The bottom bracket according to claim 13, wherein said tubular connection element comprises a first half-part in one piece with the first adapter and a second half-part in one piece with the second adapter; said first half-part axially passing over at least a portion of the second half-part; fluid-tight coupling elements being active between the first half-part and the second half-part of the tubular connection element.

* * * * *